Oct. 28, 1969  W. G. MEYERS  3,475,613
THREE-PHOTOCELL NETWORK FOR DETECTING SMALL-AREA
RADIATION SOURCE IN PRESENCE OF LARGE AREA
BACKGROUND NOISE RADIATION
Filed Oct. 9, 1967  2 Sheets-Sheet 1

William G. Meyers
INVENTOR

BY

ATTORNEY

3,475,613
THREE-PHOTOCELL NETWORK FOR DETECTING SMALL-AREA RADIATION SOURCE IN PRESENCE OF LARGE AREA BACKGROUND NOISE RADIATION
William G. Meyers, Granada Hills, Calif., assignor to TRW Inc., Redondo Beach, Calif., a corporation of Ohio
Filed Oct. 9, 1967, Ser. No. 673,812
Int. Cl. H01j 39/12; G02f 1/28
U.S. Cl. 250—217    8 Claims

ABSTRACT OF THE DISCLOSURE

A pulse-width discriminator for minimizing or substantially eliminating an undesired signal represented by a large area radiating source surrounding a small area desired source. The scanning system includes three staggered sensors, each displaced by half the width of the desired source with respect to a preceding sensor. The signals from one sensor are made to be of a polarity opposite that of the other two sensors. The signals from two different pairs of sensors are added to develop two differential signals. The proper polarity of the two different signals is selected and their time coincidence is determined to obtain an output signal representative of the desired source. The invention herein described was made in the course of a contract with the Department of the Air Force.

BACKGROUND OF THE INVENTION

This invention relates generally to a system for detecting signals in the presence of interfering signals and particularly relates to a pulse-width discriminator for distinguishing electrical pulses representative of a radiating source of small area surrounded by an undesired large area radiating source.

The problem of distinguishing signals in the presence of interfering signals frequently occurs, and its solution is not always simple. The present invention is directed toward the solution of this problem where it is necessary to detect or distinguish a radiating source of relatively small cross section in the presence of an undesired radiating source of relatively large cross section. For example, it may be necessary to distinguish a target against a cloud, both of which may radiate or reflect light or infrared energy. The same, of course, applies if one attempts to distinguish a desired radiating source or object on the ground which also reflects electromagnetic energy within the same frequency range.

SUMMARY OF THE INVENTION

In accordance with the present invention, the desired source is distinguished from the undesired source or interfering signals on the basis of spatial discrimination. This is effected by a particular array of sensors which transforms the received electromagnetic energy into a corresponding electric signal.

It is accordingly an object of the present invention to detect a source of electromagnetic energy having a relatively small area in the presence of an undesired source of electromagnetic energy having a relatively large area.

Another object of the present invention is to provide a pulse-width discriminator for minimizing or substantially eliminating the interfering pulse signals created by an undesired source of the type referred to.

A further object of the present invention is to distinguish a small area radiating source from a large area radiating source representing noise on the basis of spatial discrimination.

In accordance with the present invention, there may be provided a receiver of electromagnetic energy. Preferably, the receiver is responsive to visible or infrared light. The receiver may include a discriminator for the purpose of detecting a desired source of electromagnetic radiation of relatively small area in the presence of an undesired source of electromagnetic radiation and a relatively large area.

The discriminator comprises an array of three sensors. Each sensor is responsive to the electromagnetic energy radiated by the sources and develops a corresponding electric output signal. These sensors are arranged in staggered relationship. Preferably, each sensor is displaced from a preceding sensor by a predetermined length which may be half of a linear dimension of the imaged source to be detected. The area where the sources are found is scanned in a known manner by the sensor array.

The signals obtained from a first pair of sensors are subtracted from each other to derive a first differential signal. A second differential signal is obtained by subtracting the signals obtained from a second pair of sensors. To this end the intermediate sensor may be arranged to develop a signal of the opposite polarity of that of the signals of the first and third sensors. In that case, the signals obtained from the first and second sensors may be added as well as those from the second and third sensors, to obtain the two differential signals.

Finally, means are provided for detecting time coincidence of a particular polarity of the two differential signals. This will yield an output signal representative of the desired source.

Thus, it will be seen that the signals representative of the undesired source are made to cancel while only those representative of the small area desired source remain. The sensor array in turn permits to distinguish the desired signals from the noise signals on the basis of spatial discrimination.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

DESCRIPTION OF THE PREFERRED EMBODIMENT

Figure 1:
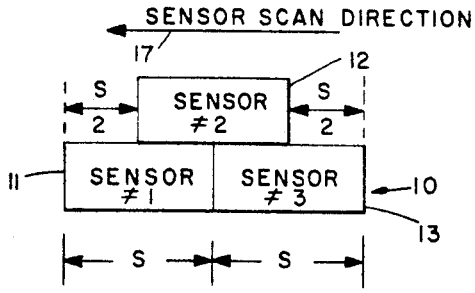
FIG. 1 is a schematic view of three sensors arranged in an array in accordance with the present invention.

Referring now to the drawings, there is shown in FIG. 1 an array 10 of three sensors 11, 12 and 13. Each of the sensors should respond to electromagnetic energy. This may, for example, be visible or infrared radiation. Accordingly, each sensor may consist of a photocell or a suitable infrared detector such as a semiconductor compound. In any case, each of the sensors 11 to 13 will respond to the electromagnetic energy to be detected to develop an electrical output signal or output pulse.

Figure 2:
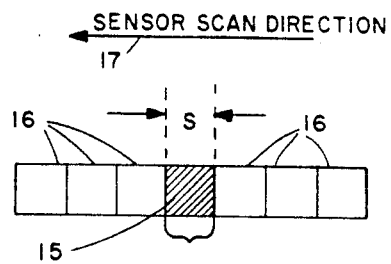
FIG. 2 is a schematic plan view illustrating a desired source of radiation surrounded by a relatively large area source of radiation representing noise.

In accordance with the present invention, the sensor array 10 is arranged in staggered relationship. FIG. 2 schematically illustrates a source 15 to be detected, encompassed or surrounded by a source 16 which has a large cross sectional area compared to that of the source 15. Accordingly, the source 16 may be considered to be a source of noise because it represents an undesired radiation. By way of example, the source 15 may be a target to be detected in the presence of a cloud representing the source 16.

The length of the source 15 along the sensor scan direction shown by the arrow 17 may be S. This may correspond to the imaged diameter of the target or one of its linear dimensions. Preferably, the sensor array 10 is so arranged that sensor #2 is displaced or staggered with respect to sensor #1 approximately by S/2, that is, by half of the length or diameter of the source 15. Similarly, sensor #3 is displaced by the same distance, that is approximately by S/2 with respect to sensor #2. Preferably, and in addition, the length of each of the three sensors 11 to 13 equals approximately S.

The three sensors 11, 12 and 13 are shown in FIG. 1 to be laterally displaced, in addition. Thus, sensor 12 is disposed laterally with respect to sensors 11 and 13 which are arranged along the sensor scan direction as shown by arrow 17. With this arrangement it will be apparent that an area is scanned which is twice the width of any one of the sensors.

In general, however, it is only important that the three sensors 11 to 13 are displaced with respect to each other along the direction of scan approximately by S/2. Thus, each sensor, such as sensor 12, is displaced with respect to the preceding sensor, such as 11, by about S/2. This may be accomplished by superposing the three sensors 11 to 13, one on top of the other. In this case, of course, the sensors must be transparent at least partly to the electromagnetic radiation to be received, so that the sensor in back will still receive the desired radiation.

Figure 3:
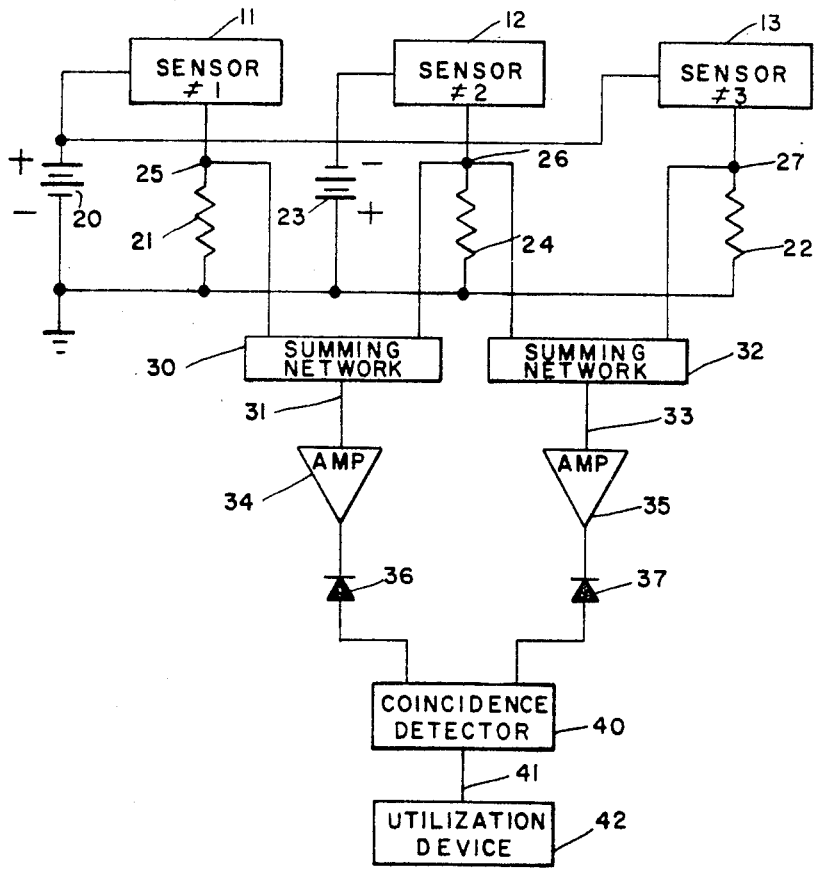
FIG. 3 is a circuit diagram, mostly in block form, of the pulse-width discriminator of the invention.

FIG. 3, to which reference is now made, illustrates, mostly in block form, a circuit in accordance with the present invention for substantially eliminating or minimizing the noise caused by an undesired source such as shown at 16. Essentially, the signals developed by the three sensors 11, 12 and 13 are subtracted in pairs and the time coincidence of the resulting or differential signals of one polarity is determined. To this end a voltage source 20 may have its negative terminal grounded while its positive terminal is connected to sensor 11 as well as to sensor 13. The output signal or output pulse of sensor 11 is developed across load resistor 21 connected between sensor #1 and ground. Similarly, the output signal or output pulse from sensor #3 is developed across load resistor 22 having one of its terminals grounded.

Another voltage source 23 may have its positive terminal grounded while its negative terminal is connected to sensor #2. The purpose of this is to develop an output signal from sensor #2 having a polarity opposite that of the signals derived from sensors #1 and #3. This output signal of opposite polarity is developed across load resistor 24 which also has one of its terminals grounded.

It will be understood, however, that all three sensors 11 to 13 may be energized by the same voltage source such as 20. In that case a conventional inverter may be serially connected in the output of sensor #2. This will again assure that the output signal developed by sensor #2 has a polarity opposite that of the signals of sensors #1 and #3.

Accordingly the output signal from sensor 11 is obtained at point 25 disposed at the junction between sensor #1 and load resistor 21. Similarly points 26 and 27 are the junction between sensor #2 and load resistor 24 and between sensor #3 and load resistor 22 respectively.

A summing network 30 has its input connected to points 25 and 26. Such a summing network 30 provides the sum of the two input signals which are the output signals of sensors #1 and #2. Such a summing network is generally well known and conventional. It may, for example, consist of two resistors connected in series and having a common load resistor. The differential signal derived from summing network 30 appears at point 31.

Similarly a summing network 32 has its two inputs connected to points 26 and 27, that is, the summing network 32 sums the signals obtained from sensors #2 and #3. The differential signal is obtained at point 33.

The two differential signals obtained respectively at points 31 and 33 are truly differential signals because they are the difference between the signals developed by sensor #1 and sensor #2 or by sensor #2 and sensor #3 respectively. However, for convenience the signal obtained from sensor #2 is inverted in polarity so that the two pairs of signals may be added rather than subtracted.

The first differential signal obtained from point 31 may be additionally amplified if necessary by an amplifier 34. Similarly the second differential signal obtained from point 33 may be amplified by an amplifier 35.

Before the two differential signals may be compared by a coincidence detector it is necessary to eliminate one polarity of each of the two differential signals. To this end a suitable polarity selector may be provided such as a diode 36 in the output of amplifier 34 and another diode 37 in the output of amplifier 35. The two diodes are so poled as to pass or transmit only the negative portion of two differential signals. This corresponds to the negative polarity of the output signal developed by sensor #2. In other words, that polarity of the differential signals is selected which corresponds to the polarity of the output signal or pulse of sensor #2.

Now, as mentioned before, the rectified differential signals obtained from diodes 36 and 37 are impressed on a coincidence detector 40. Such a pulse coincidence detector is old and well known in the art. It may include, for example, two multiplier circuits so that an output signal is only obtained if both input signals are present at the same time. This output signal may be obtained from the output lead 41 of the coincidence detector 40 and may be impressed on a suitable utilization device 42. This may consist, for example, of a relay to operate an indicator showing the presence of a desired target. However, it is more practical and provides more information to make use of a cathode ray tube display. This may have a deflection system synchronized with the scanning of the sensor array 10. Such a display is well known under the name of plan position indicator. It will, however, be understood that other types of utilization devices may be used instead.

Figure 4:
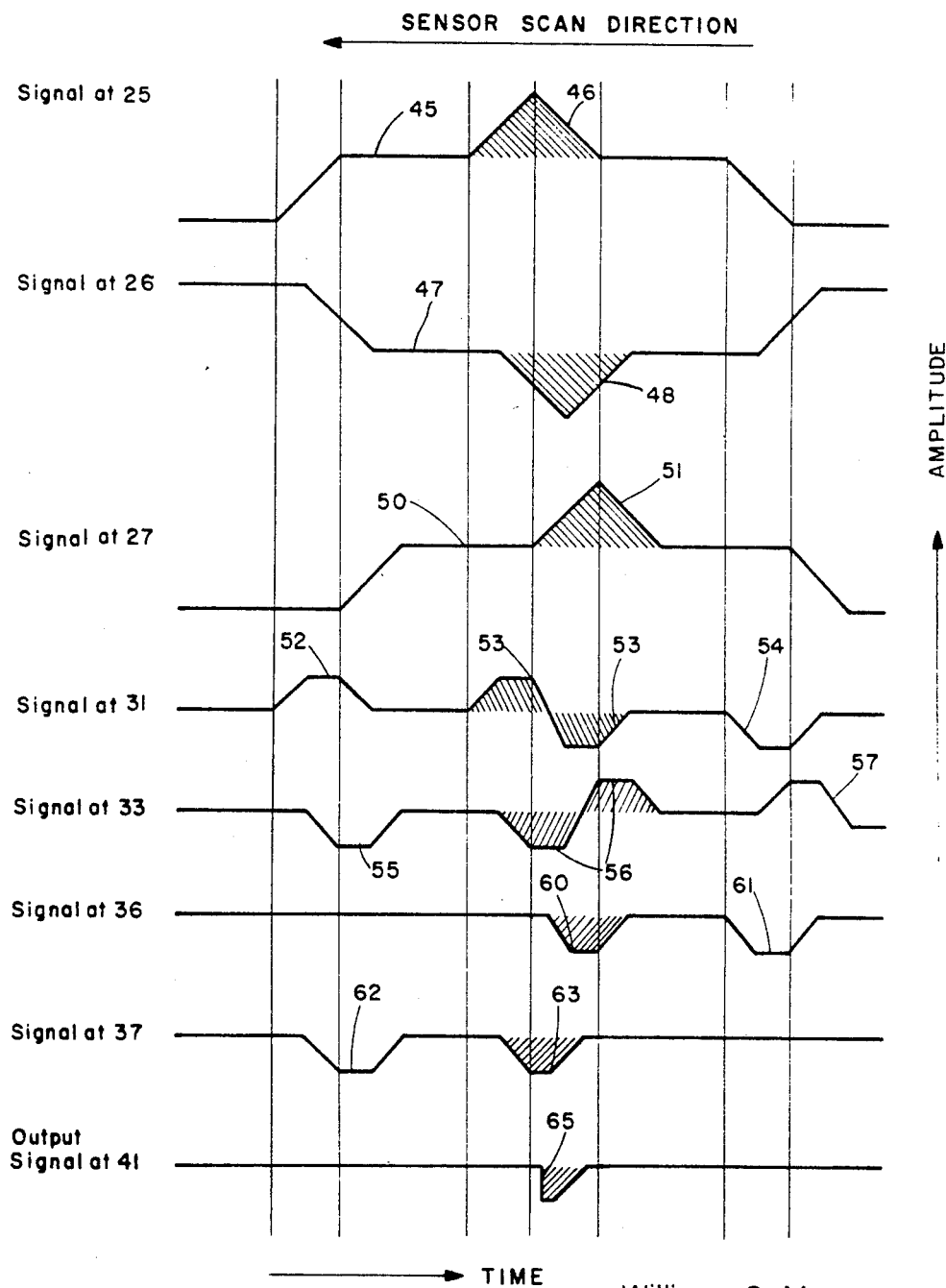
FIG. 4 is a set of curves showing signals obtained at various points of the circuit of FIG. 3 as a function of time to illustrate how the undesired signals are made to cancel.

The operation of the circuit of FIG. 3 will be evident upon inspection of FIG. 4 which shows a set of signals or pulse ploted as a function of time. Thus the signal obtained at point 25 includes a pulse pedestal 45 corresponding to the undesired source 16 and a superimposed signal or pulse 46 corresponding to the desired source 15. The pulse-like signal 46 has been shown hatched to show that it represents the desired target rather than the noise.

Similarly at the point 26 a signal is developed which as shown is of opposite polarity, and includes again a negative-going pulse pedestal 47 representing interfering signals and a superimposed target signal 48. Finally at the point 27 a signal is obtained which has the same polarity as that obtained at point 25 and includes a noise pedestal 50 and a superimposed signal 51. It will also be noted that the three signal pulses 46, 48 and 51 are displaced in time with respect to each other corresponding to the displacement in space of the three detectors 11, 12 and 13.

The differential signal which is obtained at point 31 now includes a noise pulse 52 and a signal pulse 53 having both a positive-going and a negative-going portion. This is followed by another noise pulse 54. The shape of these pulses can be readily obtained by simply adding curves 45 and 46 to curves 47 and 48.

Similarly the second differential signal obtained at point 33 includes a noise pulse 55 followed by a negative-going and positive-going signal pulse 56 followed by another noise pulse 57.

It will now be seen that the problem is to discard the respective noise pulses 52, 54 and 55, 57 while obtaining an output representative of the target pulses 53, 56. To this end, only the negative portion of the first differential signal is used, which accordingly includes a signal pulse 60 and a noise pulse 61. Similarly the negative portion of the second differential signal includes a noise pulse 62 and a signal pulse 63. The coincidence detector 40 now detects coincidence of the two negative polarity signals to yield an output pulse 65. This corresponds to the signals existing at the same time at the inputs of the coincidence detector.

It will be realized that the magnitude of the signal pulses such as 46, 48 and 51 will depend on the position of the sensor scan. In other words, if the sensors obtain all of the energy of the desired source, the amplitude will be a maximum. Otherwise the signal amplitude will be correspondingly reduced. It will also be understood that a maximum signal is obtained if the imaged width of the desired source 15 is exactly S. In other words, if the length of each sensor is equal to the imaged length of the source in the scanning direction, and if the three sensors are staggered with respect to each other by half of this width, the maximum signal-to-noise ratio is obtained. Under those conditions the noise or undesired signals should substantially cancel. However, if the width of the source to be detected is equal to 2S or larger, no signal output is obtained. Thus, if the undesired signal is at least twice as large in the scanning direction as the desired signal whose imaged length is S, then the undesired signal can be completely cancelled. The same, of course, applies if the width of the source to be detected is zero.

Accordingly the dimensions of the sensor array should be carefully coordinated with the apparent width of the desired target, that is, with the width of the target at the sensors. If this cannot be done, the apparent or imaged width of the desired source may be increased or decreased by a lens system until a useful output is obtained.

There has thus been disclosed a pulse-width discriminator for minimizing or substantially eliminating noise energy surrounding the energy radiated by a desired source. The system is suitable, for example, for detecting a target in a reflecting fluid. This is effected by spatial discrimination by means of a sensor array consisting of three sensors staggered or displaced with respect to each other along the direction of scan. The displacement should be related to the linear dimension of the source image along the direction of scan. In that case the signals from the three sensors may be subtracted in pairs, the proper polarity selected and finally time coincidence detected to yield an output signal substantially devoid of noise.

The invention and its attendant advantages will be understood from the foregoing description. It will be apparent that various changes may be made in the form, construction and arrangement of the parts of the invention without departing from the spirit and scope thereof or sacrificing its material advantages, the arrangement hereinbefore described being merely by way of example.

I claim:

1. In a receiver of electromagnetic energy, a discriminator for detecting a desired source of electromagnetic radiation of relatively small area in the presence of an undesired source of electromagnetic radiation of relatively large area, comprising:
    (a) an array of three sensors, each being responsive to electromagnetic energy for developing an electric output signal;
    (b) said sensors being arranged in staggered relationship along a direction of scan;
    (c) means for scanning an area including said sources by said sensor array;
    (d) means for subtracting the signals obtained from a first pair of said sensors to derive a first differential signal;
    (e) means for subtracting the signals obtained from a second pair of said sensors to derive a second differential signal;
    (f) means for detecting coincidence in time of a predetermined polarity of each of said first and second differential signals to derive an output signal representative of the desired source; and
    (g) means for utilizing said output signal to indicate the presence of the desired source.

2. A discriminator as defined in claim 1 wherein each of said sensors has a predetermined length related to a linear dimension of the desired source, and wherein each sensor is displaced by half of said predetermined length with respect to the preceding sensor.

3. A discriminator as defined in claim 2 wherein the second one of said sensors is additionally displaced laterally at right angles to said direction of scan with respect to the first and third one of said sensors.

4. A pulse-width discriminator for detecting a desired source of electromagnetic radiation of relatively small area surrounded by an undesired source of electromagnetic radiation of relatively large area comprising:
    (a) an array of three sensors, each being responsive to electromagnetic energy for developing an electrical output signal;
    (b) means for scanning an area including said sources by said array of sensors;
    (c) said sensors being arranged along the direction of scanning, and each sensor being displaced along said direction of scanning by a predetermined length related to a linear dimension of the desired source with respect to the preceding sensor;
    (d) means for adding the signal obtained from said first sensor to the signal of opposite polarity of said second sensor to derive a first differential signal;
    (e) means for adding the signal obtained from said second sensor to the signal of opposite polarity of said third sensor to derive a second differential signal;
    (f) means for transmitting a predetermined polarity of each of said first and second differential signals; and
    (g) means for detecting time coincidence of the single polarity differential signals to derive an output signal representative of the desired source.

5. A discriminator as defined in claim 4 wherein each of said sensors has a length equal to twice of said predetermined length.

6. A discriminator as defined in claim 5 wherein said predetermined length is one-half the diameter of the desired source and wherein the intermediate one of said sensors if laterally displaced at right angles to said direction of scanning with respect to the other two sensors.

7. The method of detecting electromagnetic radiation from a desired source of a relatively small area in the presence of and surrounded by electromagnetic radiation from an undesired source of relatively large area, said method comprising the steps of:
    (a) deriving a first electrical signal representative of the electromagnetic radiation from successive incremental areas along a predetermined direction;
    (b) deriving a second electrical signal a predetermined distance behind said incremental areas represented by said first electrical signal and along said predetermined direction, said second signal having a polarity opposite that of said first signal;
    (c) deriving a third electrical signal twice said predetermined distance behind said incremental areas represented by said first electrical signal and along said predetermined direction, said third signal having the same polarity as that of said first signal;
    (d) adding said first and said second electrical signal to provide a first differential signal;

(e) adding said second and said third signal to derive a second directional signal; and (f) determining coincidence in time between a predetermined polarity of said first differential signal and the same polarity of said second differential signal, thereby to obtain an indication of said desired source.

8. The method defined in claim 7 wherein said predetermined distance is approximately one-half a linear dimension of said desired source.

References Cited

UNITED STATES PATENTS 3,349,244  10/1967  Briggs et al. _____ 250—203

RALPH G. NILSON, Primary Examiner

M. ABRAMSON, Assistant Examiner

U.S. Cl. X.R.

250—203, 208, 209, 214